(12) United States Patent
Rofougaran et al.

(10) Patent No.: US 8,062,133 B2
(45) Date of Patent: Nov. 22, 2011

(54) POSITIONING WITHIN A VIDEO GAMING ENVIRONMENT USING RF SIGNALS

(75) Inventors: Ahmadreza (Reza) Rofougaran, Newport Coast, CA (US); Maryam Rofougaran, Rancho Palos Verdes, CA (US); Nambirajan Seshadri, Irvine, CA (US); Brima B. Ibrahim, Aliso Viejo, CA (US); John Walley, Ladera Ranch, CA (US); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 825 days.

(21) Appl. No.: 12/142,032

(22) Filed: Jun. 19, 2008

(65) Prior Publication Data
US 2008/0318691 A1    Dec. 25, 2008

Related U.S. Application Data

(60) Provisional application No. 60/936,724, filed on Jun. 22, 2007.

(51) Int. Cl.
G06F 19/00 (2006.01)
(52) U.S. Cl. ................ 463/40; 463/42; 235/375
(58) Field of Classification Search ............ 463/40, 463/42; 235/375
See application file for complete search history.

(56) References Cited

U.S. PATENT DOCUMENTS

| 7,061,429 | B2 * | 6/2006 | Fager et al. | 342/464 |
| 2004/0233100 | A1 * | 11/2004 | Dibble et al. | 342/357.06 |
| 2008/0242418 | A1 * | 10/2008 | Theimer et al. | 463/42 |
| 2009/0267895 | A1 * | 10/2009 | Bunch | 345/157 |
| 2010/0039230 | A1 * | 2/2010 | Voutilainen et al. | 340/10.1 |
| 2010/0322143 | A1 * | 12/2010 | Cai et al. | 370/315 |

OTHER PUBLICATIONS

H. Elsadek, H. Eldeeb, F. De Flaviis, L. Joffre, E. Abdallah, and E. Hashish, "A Compact 3D-Microwave Holographic Pointer System using a size Reduced Microstrip Planar Array," presented at Proceedings of the 2001 IEEE Systems, Man, and Cybernetics Conference, Tucson, AZ, 2001.

H. Elsadek, H. Eldeeb, F. De Flaviis, L. Joffre, and E. Abdallah, "Microstrip multi-element diversity antenna array for three dimensional microwave holographic input pointer (Holo 3D)," presented at IEEE Int. AP-S International Symposium on Antennas and Propagation, S. Antonio, TX, 2002.

Jeremy Kopchak, "E3 Wii Controller", XGAMING, Inc., 700 Technology Drive, Pittsburgh, PA 15219, Copyright 2005.

C.D. Haworth, Y. De Saint-Pern, Y.R. Petillot, E. Trucco, "Public security screening for metallic objects with millimetre-wave images", Imaging for Crime Detection and Prevention, 2005, ICDP 2005, The IEE International Symposium on Jun. 7-8, 2005, pp. 1-4, ISSN: 0537-9989, ISBN: 0-86341-535-0.

* cited by examiner

Primary Examiner — Ahshik Kim
(74) Attorney, Agent, or Firm — Garlick Harrison & Markison; Holly L. Rudnick

(57) ABSTRACT

The position of a mobile gaming object within a video gaming environment is determined using at least one combined Radio Frequency (RF) signal. Each combined RF signal includes at least a pair of RF signals that have a known relationship therebetween. Based on signal information representative of properties of the combined RF signal as received and the known relationship, respective distances between the mobile gaming object and a plurality of transmitter/receivers can be determined. The position of the mobile gaming object within the video gaming environment is then determined from the distances.

30 Claims, 13 Drawing Sheets

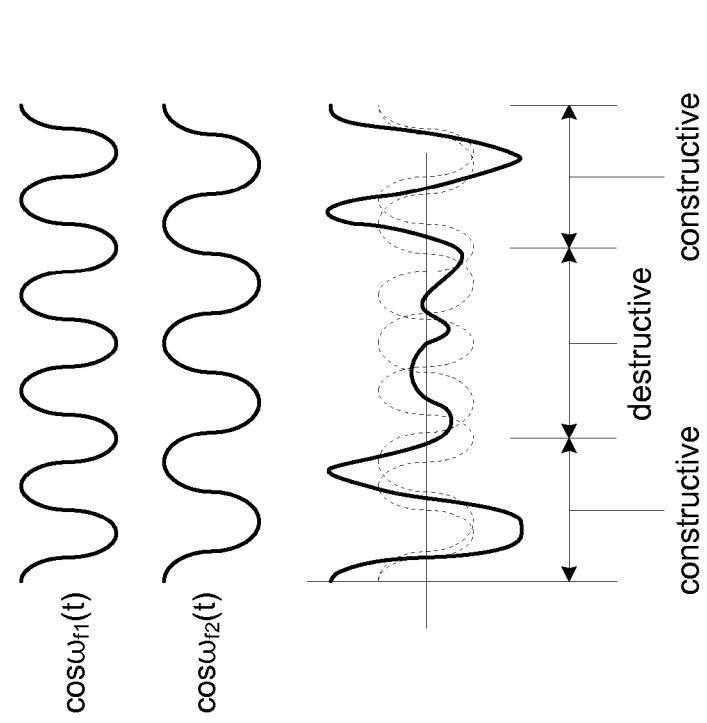
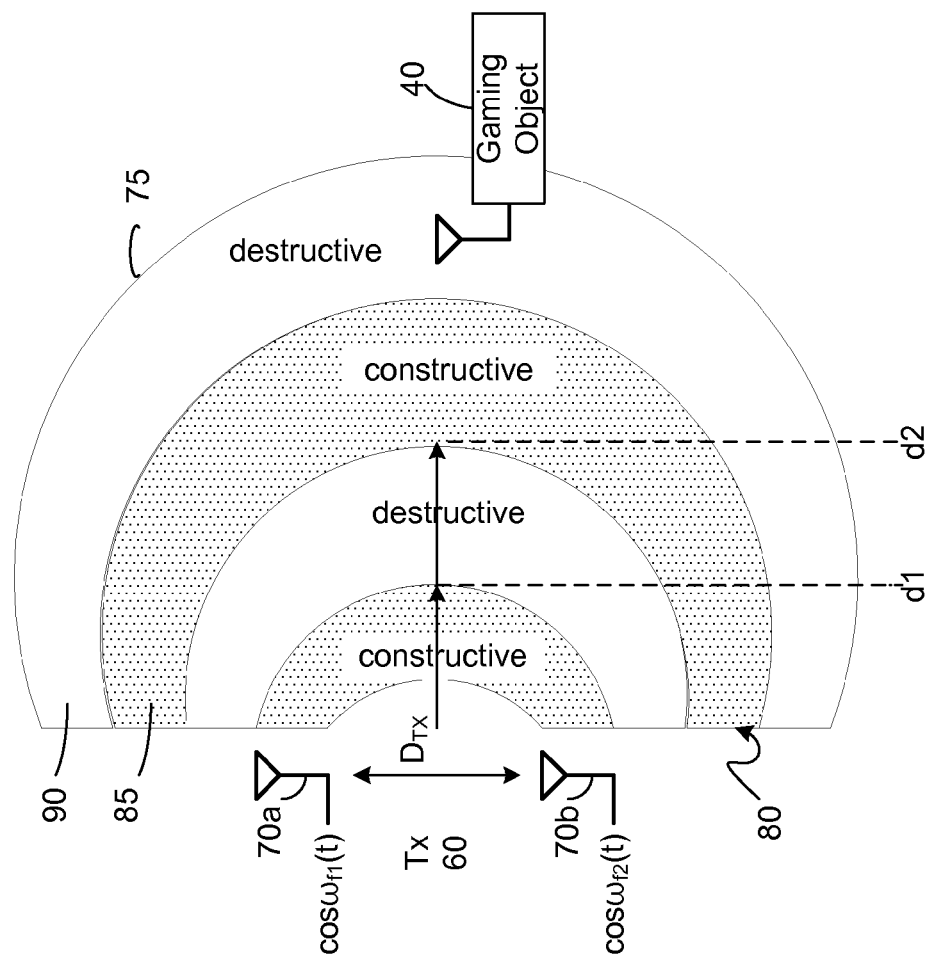
FIG. 5
FIG. 4

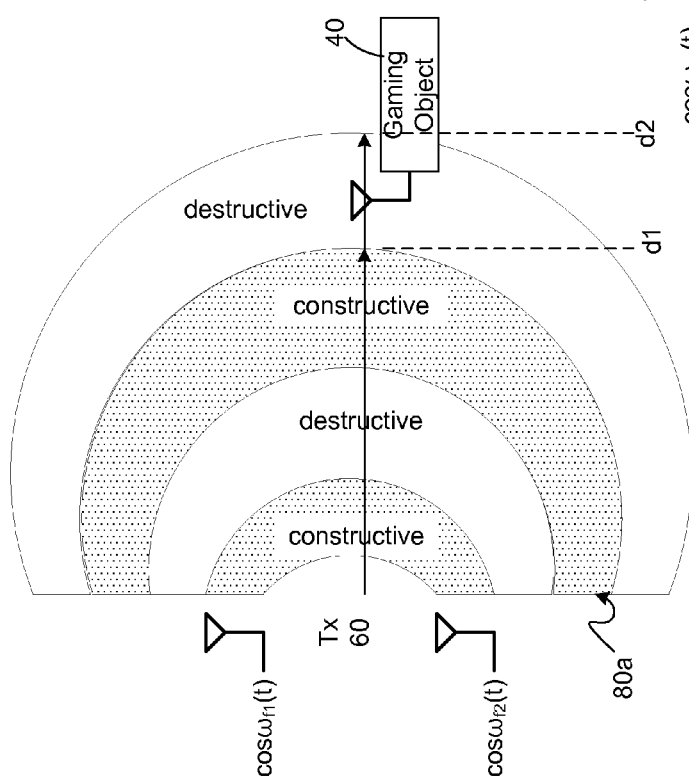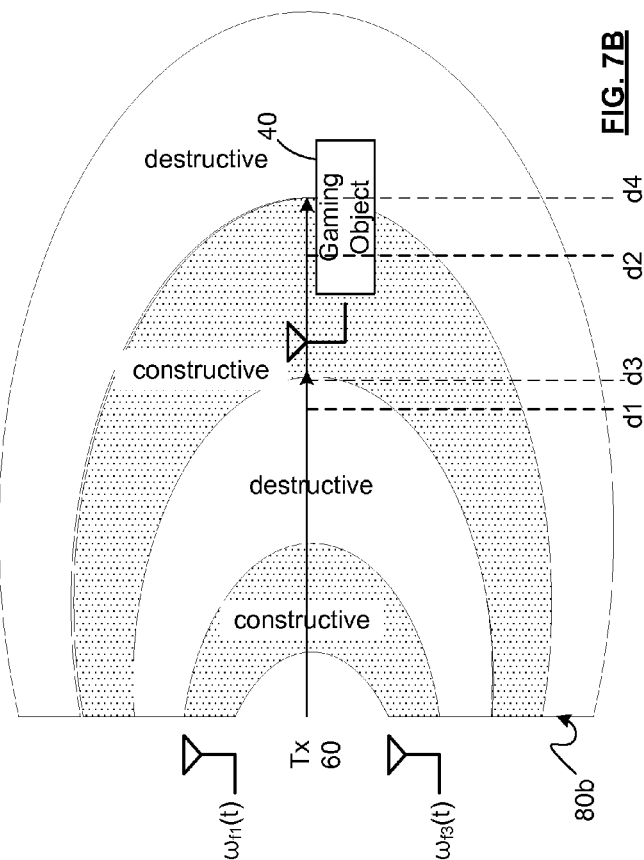
FIG. 7A
FIG. 7B

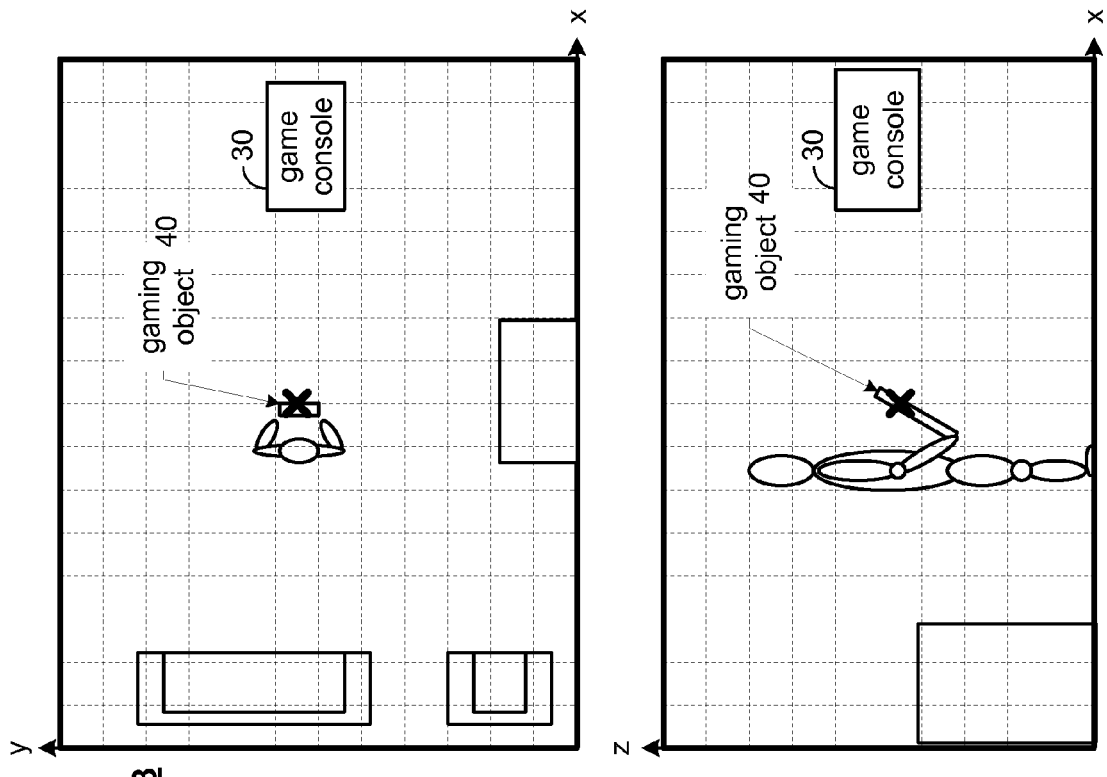
FIG. 13
FIG. 14
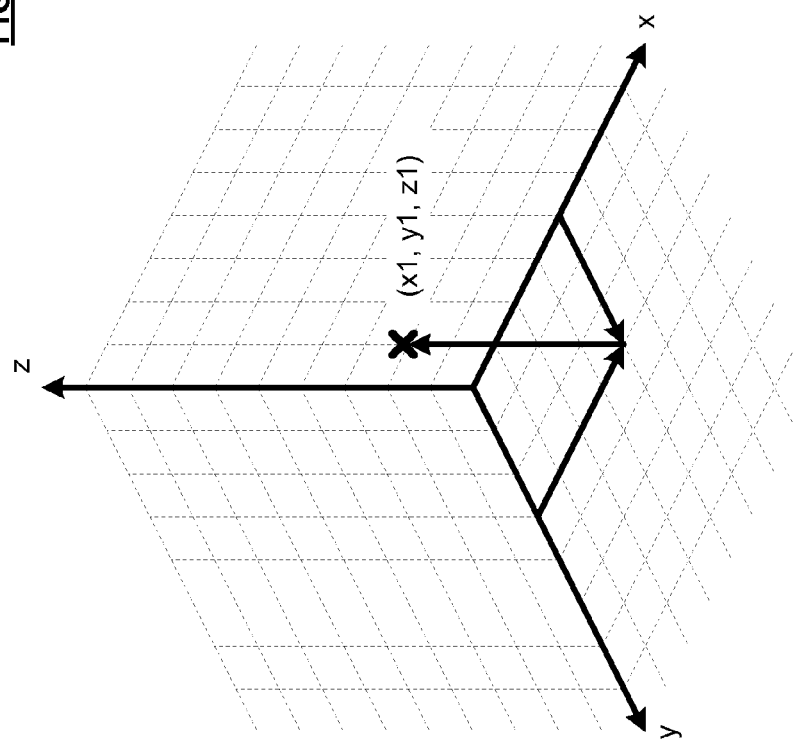
FIG. 12

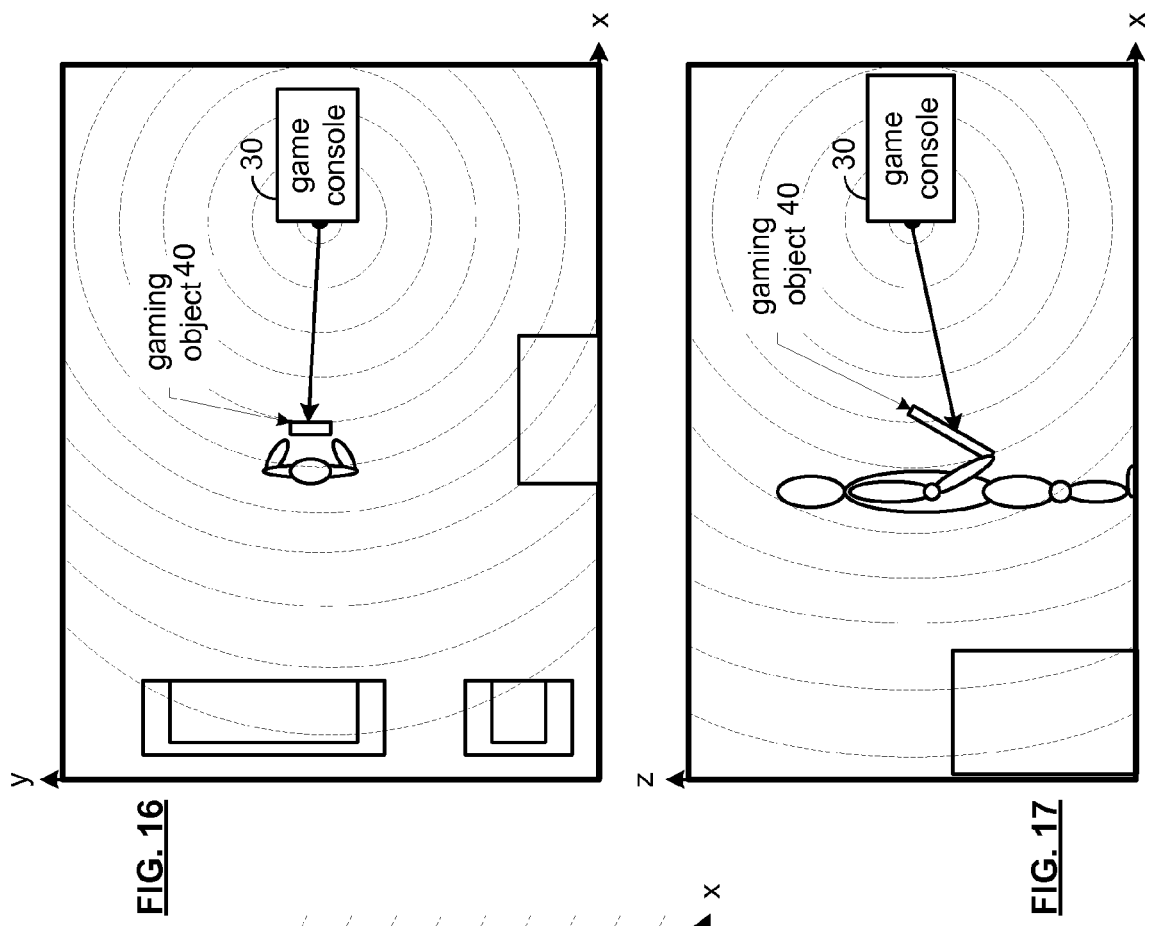
FIG. 16
FIG. 17
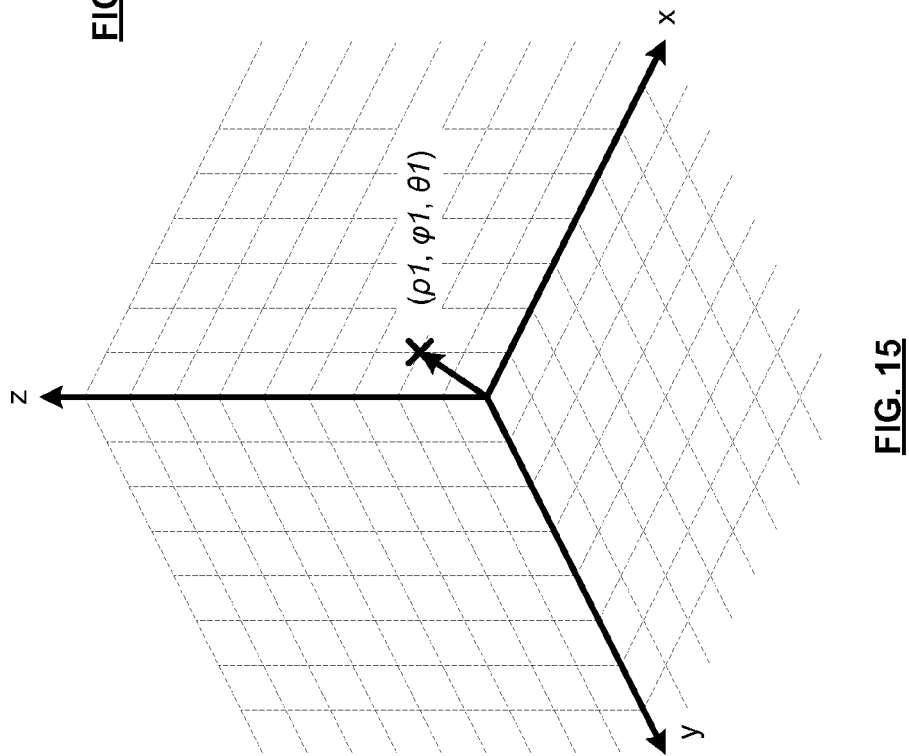
FIG. 15

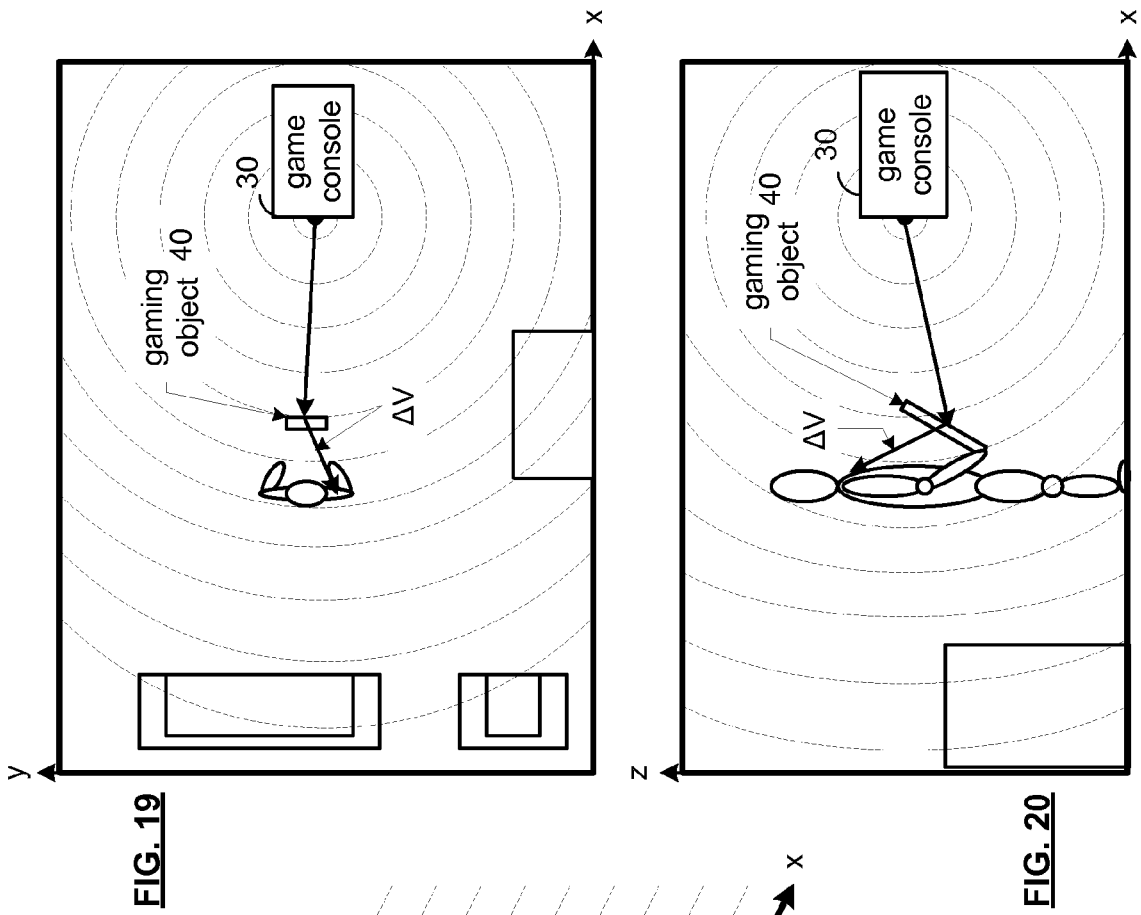
FIG. 19
FIG. 20
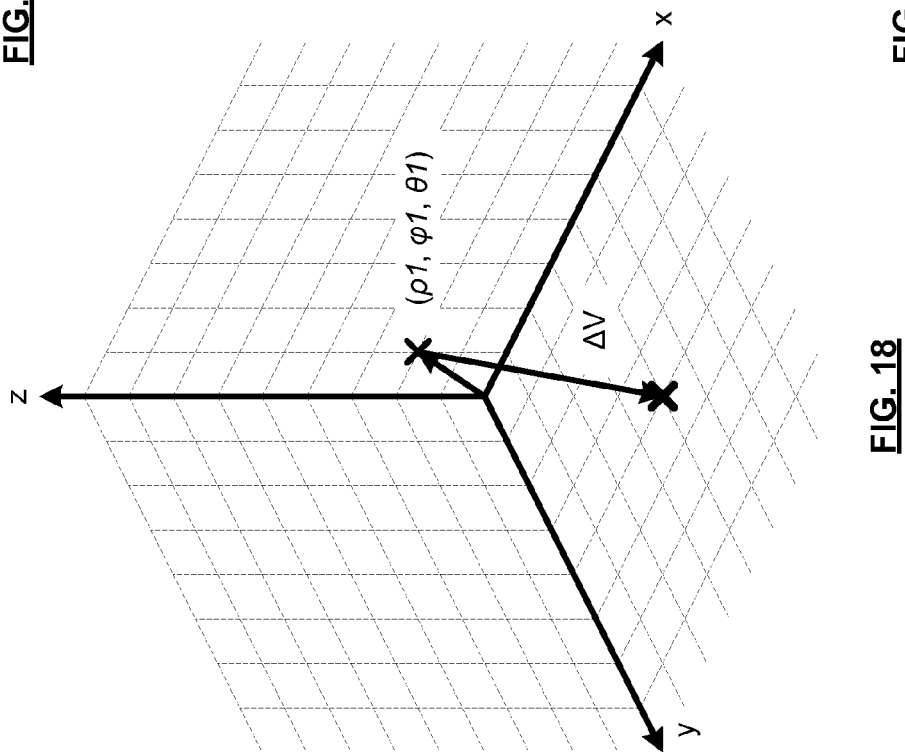
FIG. 18

POSITIONING WITHIN A VIDEO GAMING ENVIRONMENT USING RF SIGNALS

CROSS REFERENCE TO RELATED PATENTS

This patent application is claiming priority under 35 USC §119 to a provisionally filed patent application entitled POSITION AND MOTION TRACKING OF AN OBJECT, having a provisional filing date of Jun. 22, 2007, and a provisional Ser. No. 60/936,724.

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Technical Field of the Invention

This invention relates generally to wireless systems and more particularly to determining position within a wireless system and/or tracking motion within the wireless system.

2. Description of Related Art

Communication systems are known to support wireless and wire lined communications between wireless and/or wire lined communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, radio frequency (RF) wireless communication systems may operate in accordance with one or more standards including, but not limited to, RFID, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof. As another example, infrared (IR) communication systems may operate in accordance with one or more standards including, but not limited to, IrDA (Infrared Data Association).

IR communications are commonly used video games to detect the direction in which a game controller is pointed. As an example, an IR sensor is placed near the game display, where the IR sensor to detect the IR signal transmitted by the game controller. If the game controller is too far away, too close, or angled away from the IR sensor, the IR communication will fail.

Further advances in video gaming include three accelerometers in the game controller to detect motion by way of acceleration. The motion data is transmitted to the game console via a Bluetooth wireless link. The Bluetooth wireless link may also transmit the IR direction data to the game console and/or convey other data between the game controller and the game console.

While the above technologies allow video gaming to include motion sensing, it does so with limitations. As mentioned, the IR communication has a limited area in which a player can be for the IR communication to work properly. Further, the accelerometer only measures acceleration such that true one-to-one detection of motion is not achieved. Thus, the gaming motion is limited to a handful of directions (e.g., horizontal, vertical, and a few diagonal directions).

Therefore, a need exists for motion tracking and positioning determination for video gaming and other applications that overcome the above limitations.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 4 is a diagram of an example of a constructive and destructive interference pattern produced using a combined RF signal generated by a pair of RF transmitters operating at different frequencies in accordance with the present invention;

FIG. 5 is a signal diagram illustrating an example of constructive and destructive signaling in accordance with the present invention;

FIGS. 7A and 7B are diagrams illustrating examples of constructive and destructive interference patterns using variable frequencies to position a mobile gaming object in accordance with the present invention;

FIGS. 12-14 are diagrams of an embodiment of a coordinate system of a gaming system in accordance with the present invention;

FIGS. 15-17 are diagrams of another embodiment of a coordinate system of a gaming system in accordance with the present invention;

FIGS. 18-20 are diagrams illustrating a coordinate system for tracking motion of a gaming object in accordance with the present invention;

DETAILED DESCRIPTION OF THE INVENTION

Figure 1:
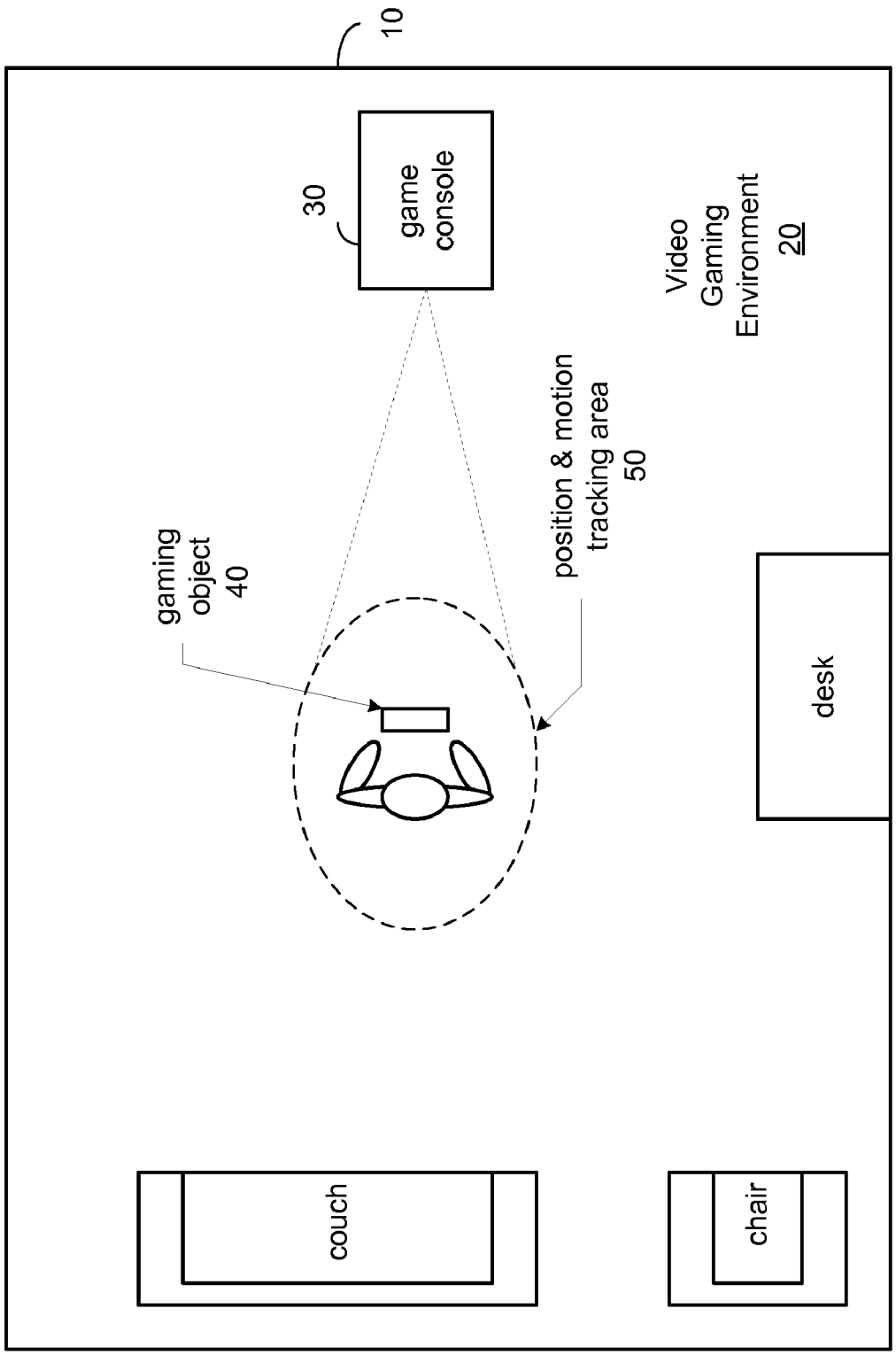
FIG. 1 is a schematic block diagram of an embodiment of an overhead view of a gaming system in accordance with the present invention.

FIG. 1 is a schematic block diagram of an overhead view of an embodiment of a gaming system 10 that includes a game console 30 and a mobile gaming object 40. The gaming system has an associated video gaming environment 20 corresponding to a physical area in which the game console 30 and the gaming object 40 are located. The physical area may be a room, portion of a room, and/or any other space where the mobile gaming object 40 and game console 30 are proximally co-located (e.g., airport terminal, on a bus, on an airplane, etc.).

The mobile gaming object 40 may be a wireless game controller and/or any object used or worn by the player to facilitate play of a video game. For example, the gaming object 40 may be a simulated sword, a simulated gun, a helmet, a vest, a hat, shoes, socks, pants, shorts, gloves, etc. The mobile gaming object 40 is able to move within a position and motion tracking area 50 of the gaming environment 20. For example, motion of the mobile gaming object 40 may be achieved through user manipulation of the mobile gaming object 40 within the gaming environment 20.

The game console 30 operates to determine the position of the mobile gaming object 40 within the gaming environment 20 using one or more positioning techniques, as subsequently discussed. Once the mobile gaming object's 40 position is determined, the game console 30 tracks the motion of the mobile gaming object 40 to facilitate video game play. For example, the game console 30 may determine the position of the mobile gaming object 40 within a positioning tolerance (e.g., within a meter) at a positioning update rate (e.g., once every second or once every few seconds) and track the motion within a motion tracking tolerance (e.g., within a few millimeters) at a motion tracking update rate (e.g., once every 10-100 milliseconds).

In operation, the game console 30 operates to determine the environment parameters of the gaming environment 20 corresponding to the physical area in which the gaming object 40 moves. The environmental parameters include, but are not limited to, height, width, and depth of the localized physical area, objects in the physical area, differing materials in the physical area, multiple path effects, interferers, etc. The game console 30 then maps the environment parameters to a particular coordinate system. As an example, if the physical area is a room, a point in the room is selected as the origin and the coordinate system is applied to at least some of the room. In addition, objects in the room (e.g., a couch, a chair, etc.) may be mapped to the coordinate system based on their physical location in the room.

Based on the mapped coordinate system, the game console 30, in conjunction with the gaming object 40, is able to determine the coordinates of the gaming object's 40 initial position in the gaming environment 20 using the one or more positioning techniques described below. It should be noted that the position of the gaming object 40 may be used to determine the position of the player(s) if the gaming object 40 is something worn by the player or is in close proximity to the player. In addition, the game console 30, in conjunction with the gaming object 40, is able to update the coordinates of the gaming object's 40 position to track its motion.

Figure 2:
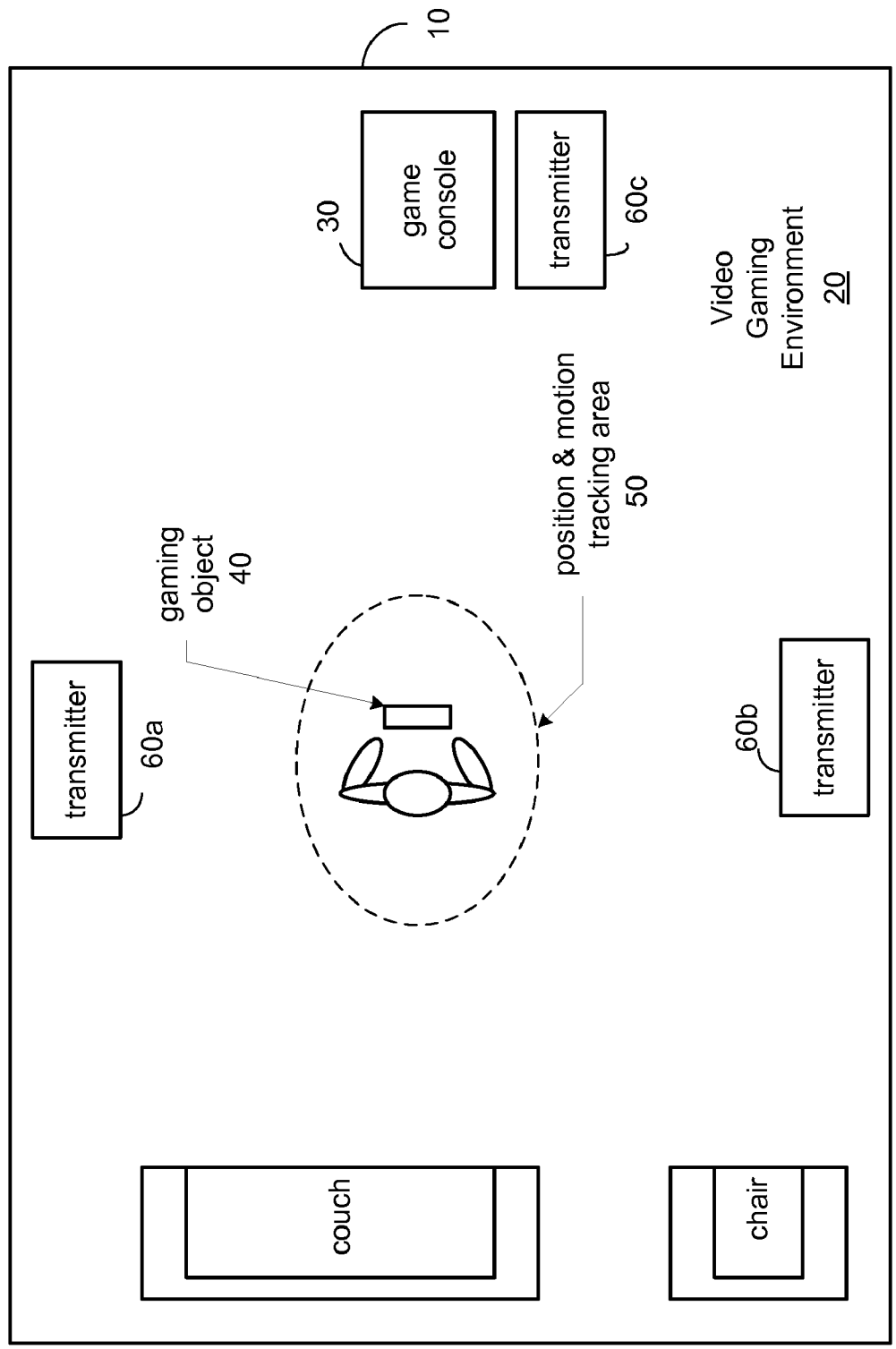
FIG. 2 is a schematic block diagram of another embodiment of an overhead view of a gaming system in accordance with the present invention.

FIG. 2 is a schematic block diagram of an overhead view of another embodiment of a gaming system 10 that includes the game console 30, the mobile gaming object 40, and multiple Radio Frequency (RF) transmitters 60a-60c within the gaming environment 20. In an embodiment, the RF transmitters 60-60c may be stand-alone devices that are physically distributed throughout the gaming environment 20 or may be included within device(s) that are already positioned within the gaming environment 20. For example, the transmitters 60a-60c may be included in access points of a WLAN, smoke detectors, motion detectors of a security system, speakers of an intercom system, light fixtures, light bulbs, electronic equipment (e.g., computers, TVs, radios, clocks, etc.), and/or any device or object found or used in a localized physical area. Typically, once the transmitters 60a-60c are positioned within the gaming environment 20, a calibration of the transmitters 60a-60c is performed to determine the fixed three-dimensional locations of the transmitters 60a-60c within the gaming environment 20.

Each RF transmitter 60a-60c is operable to transmit a combined RF signal that is formed from two or more RF signals that have a known relationship therebetween. For example, in one embodiment, the known relationship is a known frequency offset between a pair of RF signals at a known transmit power level. In another embodiment, the known relationship is a known phase offset between a pair of RF signals having the same frequency at a known transmit power level.

The transmitters 60a-60c may directionally transmit the RF signals or omni-directionally transmit the RF signals. The combination of two RF signals, each of a different frequency or different phase, produces an interference pattern of constructive and destructive areas originating from the point of origin (e.g., from the transmitter location). In constructive areas, the two RF signals combine in a constructive manner, that is, the two RF signals add together to form a combined RF signal whose amplitude is larger than either of the individual RF signals. In destructive areas, the two RF signals combine in a destructive manner, that is, the two RF signals subtract to form a combined RF signal whose amplitude is smaller than either of the individual RF signals. In general, the two RF signals will combine constructively when they are in phase with one another, and combine destructively when they are out of phase with one another.

In addition, the combined RF signal will have an in-air attenuation pattern based on the transmit power level of the combined RF signal and a path loss model (e.g., ITU indoor path loss model, another model, or calculated by placing a receiver at specific positions with respect to the transmitter, etc.) of the gaming environment 20. In embodiments in which the known relationship is a frequency offset, the two or more RF signals can be transmitted substantially simultaneously or at different times. In the latter embodiment, the respective path loss of each individual RF signal can be used to determine the constructive/destructive interference patterns.

Figure 9:
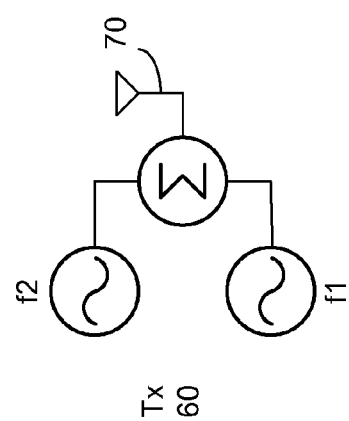
FIG. 9 is a circuit diagram illustrating an embodiment of single transmitter for producing a combined RF signal in accordance with the present invention.

In one embodiment, as shown in FIG. 4, each transmitter 60 includes at least two antennas 70a and 70b physically separated by a known distance, and each antenna 70a and 70b transmits a different sinusoidal RF signal. In air, the signals combine in a known constructive and destructive manner to produce the combined RF signal, as described above. In another embodiment, as shown in FIG. 9, each transmitter 60 includes a single antenna 70 that transmits the combined RF signal. In this embodiment, the two RF signals, each at a different carrier frequency (e.g., f1 and f2), are generated and combined within the transmitter 60 prior to transmission by the single antenna 70.

Referring again to FIG. 2, an antenna assembly of the mobile gaming object 40 receives each of the combined RF signals from the transmitters 60a-60c. In one embodiment, the mobile gaming object 40 includes a single antenna for receiving the combined RF signals. In another embodiment, the mobile gaming object 40 includes three antennas, one for receiving the combined RF signals, and the other two for receiving the individual RF signals that make up the combined RF signals. The individual RF signals can be used to enhance the accuracy of the mobile gaming object 40 position determination based on the attenuation of the individual RF signals, as described below with respect to FIG. 8. For example, the received signal strength of the individual RF signals can be used to more accurately determine the distance between the mobile gaming object 40 and the transmitter.

Based on the known constructive and destructive patterns for each combined RF signal, the respective distances between the mobile gaming object 40 and each of the transmitters 60a-60c may be determined. By obtaining multiple distances from multiple transmitters, and with knowledge of the fixed transmitter locations, the position and/or motion of the mobile gaming object 40 can be determined. In one embodiment, the mobile gaming object 40 calculates the distances between the mobile gaming object 40 and the transmitters 60a-60c and provides the distances to the game console 30 for use in calculating the position of the mobile gaming object 40 within the gaming environment 20. In another embodiment, the mobile gaming object 40 provides signal properties of the received combined RF signals to the game console 30, and the game console 30 calculates the distances between the mobile gaming object 40 and the transmitters 60a-60c and the position of the mobile gaming object 40 within the gaming environment 20 based on these signal properties.

In an exemplary operation, each transmitter 60a-60c transmits a respective combined RF signal, in which each combined RF signal is formed from two or more RF signals having different carrier frequencies or the same carrier frequency with different phases. For example, a first antenna of a particular transmitter, e.g., transmitter 60a, may be tuned to transmit a first frequency, while a second antenna of that particular transmitter 60a may be tuned to transmit a second frequency. The RF signals may be sinusoidal tones and/or RF communications in accordance with a wireless communication protocol. In addition, each transmitter 60a-60c may operate using the same set of frequencies (e.g., the same carrier frequency or frequency offset) or different sets of frequencies (e.g., different carrier frequencies or frequency offsets) to produce their combined RF signals. In the former situation where the same frequencies are used, the transmitters 60a-60c may transmit their combined RF signals in a Time Division Multiple Access (TDMA) manner so as to avoid interference between the combined RF signals. In the latter situation where different frequencies are used for each combined RF signal, the transmitters 60a-60c may transmit their combined RF signals in a Frequency Division Multiple Access (FDMA) manner.

Moreover, one of the RF signals making up a particular combined RF signal may have a fixed frequency or phase, while another RF signal making up that particular combined RF signal may have a variable frequency or phase that is varied by that particular transmitter to facilitate improved positioning of the mobile gaming object 40. For example, if the mobile gaming object 40 is located within a destructive area of a particular transmitter, e.g., transmitter 60a, that transmitter 60a can adjust the frequency of the variable RF signal to place the mobile gaming object 40 within a constructive interference area to increase the amplitude of the received combined RF signal, and improve the accuracy of any resulting measurements. In this instance, the difference in frequencies or phases between the mobile gaming object 40 lying in a constructive area and a destructive area can be used to facilitate the determination of its distance to the transmitter 60a. As another example, the transmitter 60a can sweep through the frequency range of the variable RF signal or implement a frequency hopping pattern to obtain a series of measurements in response to varying constructive, destructive interference patterns to improve the accuracy by achieving finer granularity of the resulting position of the mobile gaming object 40.

The mobile gaming object 40 receives each of the combined RF signals and analyzes the received combined RF signals to determine signal properties of each of the RF signals. For example, each combined RF signal will be received with different constructive and destructive interaction between the pair of RF signals forming the combined RF signal based on the orientation of the mobile gaming object 40 with respect to the transmitters 60a-60c. In this manner, as the properties of the respective signals changes, the movement of the gaming object 40 may be determined.

In another embodiment, instead of using multiple transmitters, a single transmitter can be placed within the mobile gaming object and multiple receivers can be positioned throughout the gaming environment. In this embodiment, the transmitter transmits a single combined RF signal that is received by each of the receivers. Each receiver analyzes the received combined RF signal to determine respective signal properties thereof. For example, each received combined RF signal will be received with different constructive and destructive interaction between the pair of RF signals forming the combined RF signal based on the orientation of the mobile gaming object 40 with respect to the receivers. Based on the known constructive and destructive patterns for each combined RF signal, the respective distances between the mobile gaming object 40 and each of the receivers may be determined. By obtaining multiple distances from multiple receivers, and with knowledge of the fixed receiver locations, the position and/or motion of the mobile gaming object 40 can be determined. In one embodiment, the receivers communicate the signal information to the mobile gaming object 40 and/or the game console 30, and the distance calculation is then performed by the mobile gaming object 40 and/or the game console 30. In another embodiment, the receivers calculate their respective distances to the mobile gaming object, and the distances are communicated to the mobile gaming object 40 and/or game console 30 for use in determining the position of the mobile gaming object 40.

Figure 3:
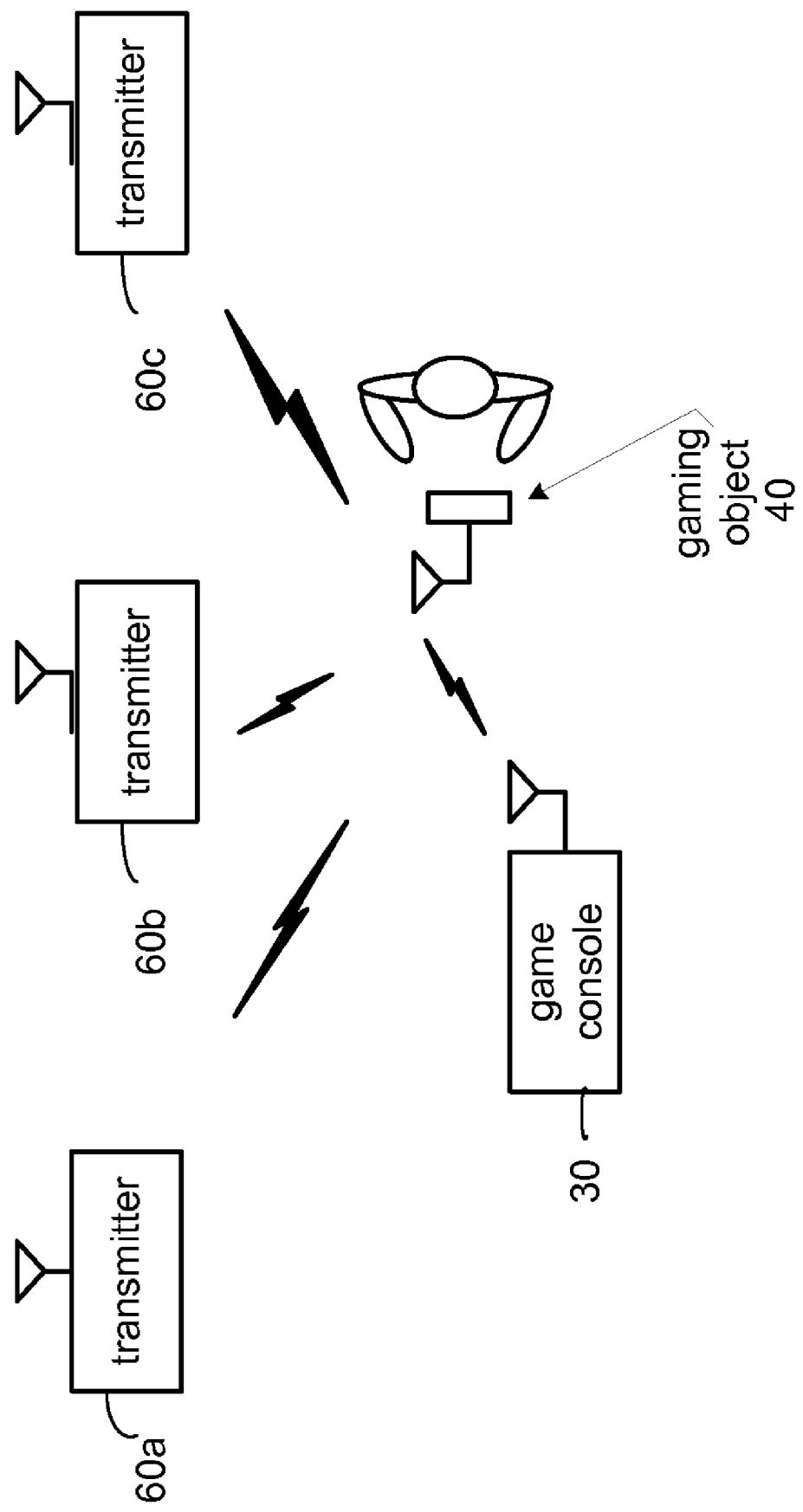
FIG. 3 is a schematic block diagram illustrating RF communication between devices within a gaming system in accordance with the present invention.

FIG. 3 is a schematic block diagram illustrating various types of communication between the transmitters 60a-60c, mobile gaming object 40 and game console 30 in accordance with embodiments of the present invention. As shown in FIG. 3, each of the transmitters 60a-60c is operable to transmit a respective combined RF signal that is received by a gaming receiver of the mobile gaming object 40. The mobile gaming object 40 further includes a gaming transmitter that is operable to transmit RF signals containing signal information (i.e., signal properties, distances and/or positions) associated with the received combined RF signals to the game console 30 for use in determining the position and/or motion of the mobile gaming object 40.

The mobile gaming object receiver may use a different frequency than the mobile gaming object transmitter for RF communications or it may use the same, or nearly the same, frequency. In the latter case, the frequency spectrum may be shared using a TDMA, FDMA, or some other sharing protocol. If the mobile gaming object transmitter and receiver share the frequency spectrum, they may share the antenna structures.

FIG. 4 is a diagram of an example of constructive and destructive signaling to facilitate the determination of positioning and/or motion tracking. In the embodiment shown in FIG. 4, two antennas 70a and 70b physically separated by a known distance $D_{TX}$ transmit different sinusoidal signals, $A_1 \cos \omega_1 t$ and $A_2 \cos \omega_2 t$. In one embodiment, $\omega_1$ corresponds to a first carrier frequency and $\omega_2$ corresponds to a second carrier frequency, such that $\omega_1$ and $\omega_2$ have a known frequency offset therebetween. In this embodiment, the two sinusoidal signals $A_1 \cos \omega_1 t$ and $A_2 \cos \omega_2 t$ can be transmitted substantially simultaneously or $A_1 \cos \omega_1 t$ can be transmitted at a first time $t_1$ and $A_2 \cos \omega_2 t$ can be transmitted at another time $t_2$. In yet another embodiment, the two sinusoidal signals $A_1 \cos \omega_1 t$ and $A_2 \cos \omega_2 t$ have the same carrier frequency, but different phases, such that $\omega_1 = \omega_2$+phase offset.

In air, the signals combine in a constructive and destructive manner to produce an interference pattern 80 corresponding to areas of constructive interference 85 and areas of destructive interference 90. As shown in FIG. 4, the constructive/destructive interference areas are mapped onto a plane to form concentric rings 75 of constructive and destructive interference that are centered on the transmitter 60. Each ring 75 has an inner surface whose distance (d1) to the transmitter 60 corresponds to the radius of the inner surface of the ring 75 and an outer surface whose distance (d2) to the transmitter 60 corresponds to the radius of the outer surface of the ring 75. Thus, each ring 75 encompasses all of the distances to the transmitter that fall between the two respective radii for that ring 75 (e.g., all distances between d1 and d2).

Based on initial calibrations performed when the transmitters 60 are first configured within the gaming environment, the constructive and destructive interference patterns 80 (e.g., the actual combined RF signals as received that make-up the pattern), along with the constructive and destructive areas 85 and 90, respectively, corresponding to those patterns, are determined. Thus, when the gaming object 40 receives the combined RF signal from a particular transmitter 60, the mobile gaming object 40 is able to determine where the received combined RF signal lies within the constructive and destructive pattern 80 for that transmitter 60, and therefore, whether the mobile gaming object 40 lies within a constructive or destructive area 85 or 90, respectively. For example, as shown in FIG. 4, the combined RF signal received by the mobile gaming object 40 is a destructively combined RF signal, indicating that the mobile gaming object 40 is located within a destructive interference area 90. In particular, the combined RF signal as received by the mobile gaming object 40 indicates that the mobile gaming object 40 is located within the second destructive interference area 90 of the interference pattern 80.

Based on which constructive/destructive area that the mobile gaming object 40 is located in, the distance between the transmitter 60 and the mobile gaming object 40 can be determined. In one embodiment, each constructive and destructive area 85 and 90, respectively, is assigned a particular distance from the transmitter 60 that is within that area. For example, the distance assigned to a particular area can be the distance d1 from the transmitter 60 to the inner surface of the concentric ring 75 forming that area, the distance d2 from the transmitter 60 to the outer surface of the concentric ring 75 forming that area or to some distance between d1 and d2.

FIG. 5 is a signal diagram illustrating constructive and destructive signaling in accordance with the present invention. FIG. 5 illustrates an exemplary standing wave produced as a result of a combination of two RF signals having a known frequency offset therebetween that can be used to enhance the position determination of the mobile gaming object. By comparing the known standing wave to the received combined RF signal, not only can the particular constructive or destructive area that the mobile gaming object is located in be determined, but also an estimate can be made of where the mobile gaming object lies within that particular constructive or destructive area.

For example, assume a transmitter transmits a first signal $A_1 \cos \omega_1 t$ from a first antenna and a second signal $A_2 \cos \omega_2 t$ from a second antenna, the resulting combined in-air signal is:

$$y(t) = A_1 \cos \omega_1 t + A_2 \cos \omega_2 t, \quad \text{(Equation 1)}$$

which can also be represented as:

$$y(t) = 2(A_1 + A_2)\cos\frac{1}{2}(\omega_1 + \omega_2)t * \cos\frac{1}{2}(\omega_1 - \omega_2)t. \quad \text{(Equation 2)}$$

If $\omega_2 = x\omega_1$ and $A_y = 2(A_1 + A_2)$, then:

$$y(t) = A_y \cos\left(\frac{1+x}{2}\right)\omega_1 t * \cos\left(\frac{1-x}{2}\right)\omega_1 t. \quad \text{(Equation 3)}$$

The frequency of the lower frequency (or slower) signal component $$\left(\frac{1-x}{2}\right)\omega_1 t$$

in Equation 3 dictates where the destructive interference areas are within the resulting combined standing wave due to the fact the signal components will add destructively over a greater portion of the standing wave when the amplitude of the slower signal component is at a minimum than when the amplitude of the faster signal component is at a minimum, as can be seen in FIG. 5. Therefore, the destructive areas can be defined based on an angle of $$\left(\frac{1-x}{2}\right)\omega_1 t$$

(e.g., −30° to 30° and +150° to +210°).

Once the destructive areas are identified within the standing wave and the amount of signal attenuation due to path loss (i.e., $A_y$ decreases with respect to distance from the transmitter) is factored into the predetermined standing wave, the amplitude and phase of the received combined RF signal can be analyzed to determine where the received combined RF signal matches up with the predetermined standing wave. Again, since the frequency of the slower signal component $$\left(\frac{1-x}{2}\right)\omega_1 t$$

dictates where the destructive interference areas are within the resulting combined standing wave, the wavelength of the resulting standing wave corresponds to the wavelength of the slower signal component $$\left(\frac{1-x}{2}\right)\omega_1 t.$$

As such, by determining the number of cycles in the standing wave prior to the position of the received combined RF signal within the standing wave and multiplying the number of cycles by the wavelength of the slower signal component, an estimated distance between the transmitter and the mobile gaming object corresponding to the distance between the transmitter and the particular interference area within which the mobile gaming object is located can be calculated.

To determine the wavelength of the slower signal component, the coefficient x can be set, for example, such that $1 \leq x \leq 2$, which yields a particular ratio between the frequencies of the signal components $$\left(\frac{1+x}{2}\right)\omega_1 t \text{ and } \left(\frac{1-x}{2}\right)\omega_1 t.$$

This ratio can be used to easily determine the wavelength of the slower signal component $$\left(\frac{1-x}{2}\right)\omega_1 t.$$

As an example, setting x to 1.1 yields a ratio of 20:1 between the frequencies of $$\left(\frac{1+x}{2}\right)\omega_1 t$$

and $$\left(\frac{1-x}{2}\right)\omega_1 t,$$

setting x to 1.25 yields a ratio of 9:1 between the frequencies of $$\left(\frac{1+x}{2}\right)\omega_1 t$$

and $$\left(\frac{1-x}{2}\right)\omega_1 t,$$

and setting x to 2 yields a ratio of 3:1 between the frequencies of $$\left(\frac{1+x}{2}\right)\omega_1 t \text{ and } \left(\frac{1-x}{2}\right)\omega_1 t.$$

Using the above ratios, when $\omega_1$ is set to 60 GHz, the frequencies and wavelengths of the corresponding signal components $$\left(\frac{1+x}{2}\right)\omega_1 t \text{ and } \left(\frac{1-x}{2}\right)\omega_1 t$$

are as shown in the following table:

TABLE 1

| x | $\left(\frac{1+x}{2}\right)\omega_1 t$ | $\left(\frac{1-x}{2}\right)\omega_1 t$ |
|---|---|---|
| 1.1 | f = 63 GHz | f = 3 GHz |
|  | λ = 4.77 mm | λ = 100 mm |
| 1.25 | f = 67.5 GHz | f = 7.5 GHz |
|  | λ = 4.4 mm | λ = 40 mm |
| 2 | f = 90 GHz | f = 30 GHz |
|  | λ = 3.3 mm | λ = 10 mm |

Thus, with knowledge of the ratio between the frequencies of the signal components, the wavelength of the slower signal component can be easily determined, which enables the distance between the transmitter and the mobile gaming object to be calculated by comparing the received combined RF signal to the predetermined standing wave for the combined RF signal.

In addition, the higher the ratio is between the signal components, the narrower the destructive interference areas are with respect to the constructive interference areas. For example, using the same angle of $$\left(\frac{1-x}{2}\right)\omega_1 t$$

to define the destructive areas, as the wavelength of the slower signal component decreases, the percentage of the standing wave defined by the angle of $$\left(\frac{1-x}{2}\right)\omega_1 t$$

decreases, which effectively decreases the percentage of the standing wave that include destructive interference areas. Therefore, by increasing the ratio between the signal components and adjusting $\omega_2$ to position the mobile gaming object within a destructive interference area, the distance estimate between the transmitter and the mobile gaming object can be improved.

Figure 6:
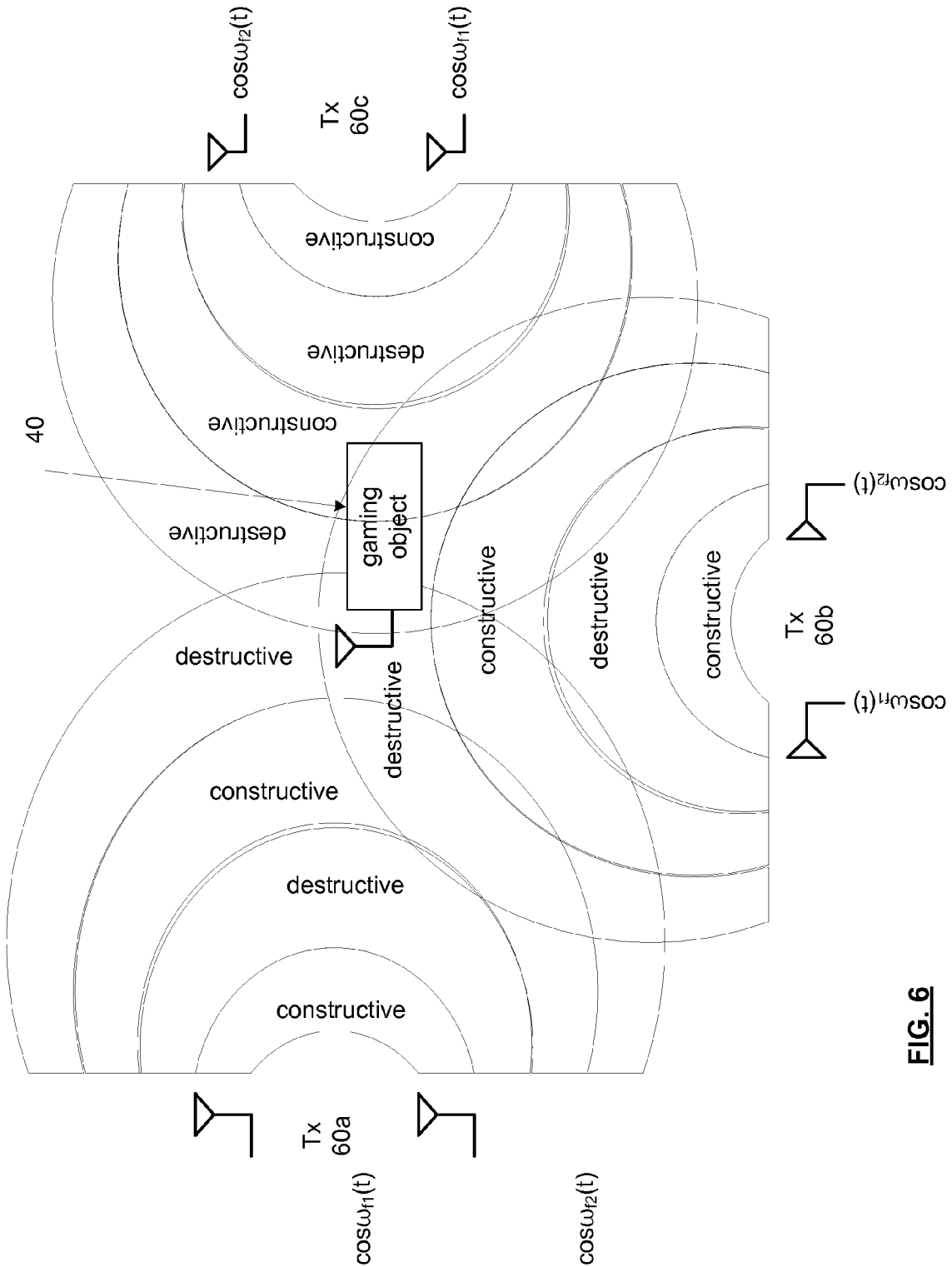
FIG. 6 is a diagram illustrating an example of multiple constructive and destructive interference patterns for use in determining a position of a mobile gaming object in accordance with the present invention.

Turning now to FIG. 6, with the known position of the transmitter, e.g., transmitter 60a, and the distance between the transmitter 60a and the mobile gaming object 40, the mobile gaming object's location can be determined to be somewhere on the surface of an imaginary sphere (shown as a circle in two-dimensions) centered on that transmitter 60a, and whose radius is the distance to it. As shown in FIG. 6, when the distance to at least three transmitters 60a-60c is known, the intersection of the three imaginary spheres reveals the position of the mobile gaming object 40. To determine the position of the mobile gaming object in three-dimensions, the distance to four or more transmitters may be preferred.

Since each constructive/destructive area covers a range of distances (Δd=d2=d1), the assigned distance for that area will only be an estimate, and may not meet positioning tolerance criteria for the gaming system. For instance, at 60 GHz, the wavelength is 5 mm, whereas at 6 GHz, the wavelength is 50 mm. As such, combining signals in the 60 Hz range will produce mm accuracy, while combining signals in the 6 GHz range will produce cm accuracy.

Therefore, in another embodiment, as shown in FIGS. 7A and 7B, one of the RF signals has a variable frequency, and the transmitter 60 is able to sweep through multiple frequencies for the variable RF signal to more accurately determine the distance between the mobile gaming object 40 and the transmitter 60. For example, as shown in FIG. 7A, by using a first combination of two frequencies (f1 and f2) for the transmitter 60 that produces a first interference pattern 80a, a first range of distances (between d1 and d2) between the transmitter 60 and the mobile gaming object 40 can be determined. Then, as shown in FIG. 7B, by using a second combination of frequencies (f1 and f3) for the transmitter 60 that produces a second interference pattern 80b, a second range of distances (between d3 and d4) between the transmitter 60 and mobile gaming object 40 can be determined. It can be seen from FIG. 7B that the two ranges of distances partially overlap. Therefore, in order to improve the accuracy of the distance measurement, the distance from the transmitter 60 to the mobile gaming object 40 can be determined from the overlapping distances (i.e., the distance can be some distance between d3 and d2). Subsequent frequency combinations can further narrow the range of distances, and therefore, further improve the distance measurement.

For example, referring again to Equation 3 and Table 1 above, by adjusting the frequency of $\omega_2$ to produce a higher ratio between the signal components, the wavelength of the slower signal component can be reduced, thereby reducing the distance between adjacent interference areas and effectively narrowing the range of distances within which the mobile gaming object is located. In addition, by increasing the ratio between the signal components and adjusting $\omega_2$ to position the mobile gaming object within a destructive interference area, the distance estimate between the transmitter and the mobile gaming object can be further improved.

Figure 8:
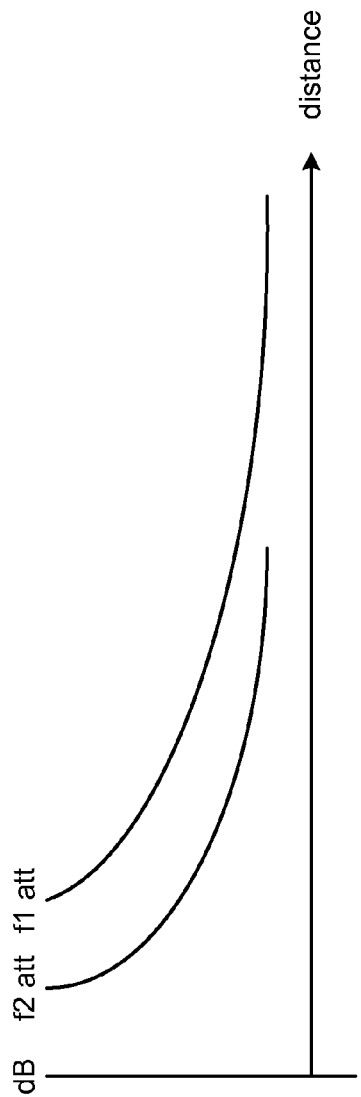
FIG. 8 is a diagram of an example of frequency dependent in-air attenuation for use in positioning a mobile gaming object in accordance with the present invention.

In another embodiment, with reference now to FIG. 8, the distance estimation can be additionally enhanced using the known attenuation of an RF signal, as described above. In general, attenuation is proportional to the square of the distance between the transmitter and receiver. As an example, an 802.11b radio operating at 11 Mbps will experience approximately 100 dB of attenuation at about 200 feet. In addition, attenuation is also proportional to the square of the frequency of the RF signal Thus, the attenuation increases as the frequency or range increases. For example, as shown in FIG. 8, f2 is of a higher frequency and thus attenuates in air more quickly over distance than the f1 signal. Therefore, by measuring the received signal strength of either the combined RF signal (in the case of a single transmit antenna) or one of the individual RF signals making up the combined RF signal (in the case of two or more transmit antennas), and with knowledge of the transmission power of that signal, the distance between the transmitter and the mobile gaming object can be more accurately determined.

Figure 10:
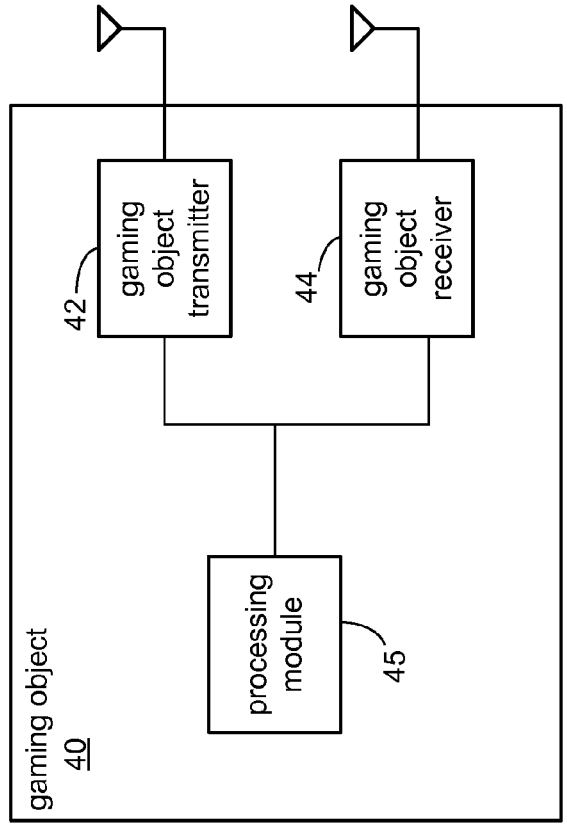
FIG. 10 is a schematic block diagram of an embodiment of a gaming object in accordance with the present invention.

FIG. 10 is a schematic block diagram of an embodiment of a gaming object 40 that includes a gaming object transmitter 42, a gaming object receiver 44 and a processing module 45. The gaming object receiver 44 is coupled to receive a plurality of combined RF signals, each transmitted by a respective transmitter located within the gaming environment. The gaming object transmitter 42 is coupled to transmit RF signals containing signal information (i.e., signal properties, distances and/or positions) associated with the received combined RF signals to the game console for use in determining the position and/or motion of the mobile gaming object 40.

The processing module 45 is operable to process the received combined RF signals to produce signal information representative of properties of the received combined RF signals and to provide this signal information, via the gaming transmitter 42, to the game console. For example, in one embodiment, the processing module 45 processes the received combined RF signals to extract signal properties that indicate which constructive/destructive interference areas that the mobile gaming object 40 lies within and transmits these signal properties, via the gaming transmitter 42, to the game console for use in determining the distances between the mobile gaming object 40 and the transmitters and in determining the position of the mobile gaming object 40 within the gaming environment. In another embodiment, the processing module 45 processes the received combined RF signals to determine the actual constructive/destructive interference areas that the mobile gaming object 40 lies within and provides this information to the game console for use in determining the distances between the mobile gaming object 40 and the transmitters and in determining the position of the mobile gaming object 40 within the gaming environment.

In yet another embodiment, the processing module 45 calculates the distances between the mobile gaming object 40 and the transmitters and provides these distances to the game console for use in calculating the position of the mobile gaming object 40 within the gaming environment. In still another embodiment, processing module 45 calculates both the distances between the mobile gaming object 40 and the transmitters and the position of the mobile gaming object 40 within the gaming environment and provides this position to the game console to facilitate video game play.

The processing module 45 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 45 may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-23.

Figure 11:
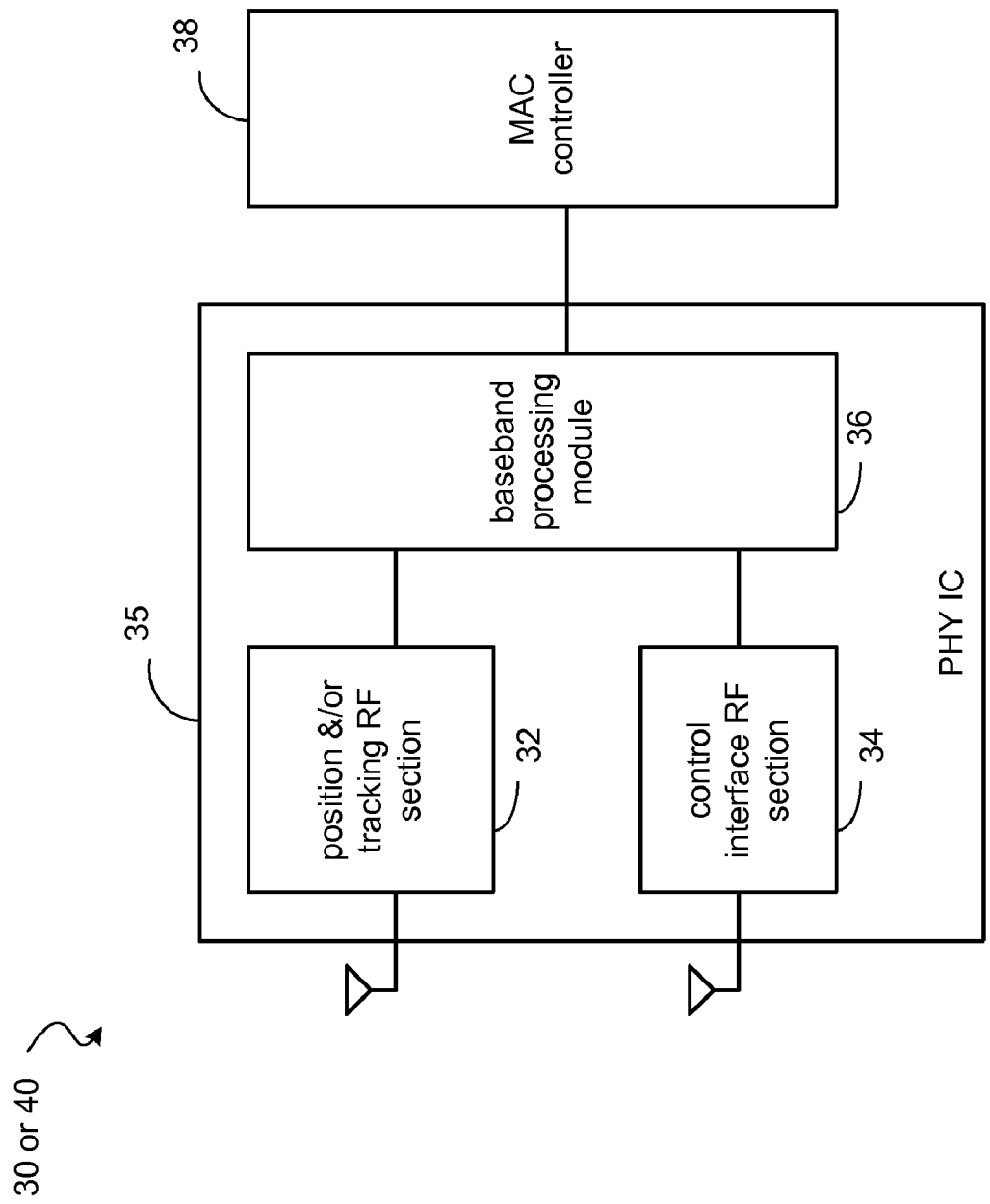
FIG. 11 is a schematic block diagram of an embodiment of a gaming object and/or game console in accordance with the present invention.

FIG. 11 is a schematic block diagram of an embodiment of a gaming object 40 and/or game console 30 that includes a physical layer (PHY) integrated circuit (IC) 35 and a medium access control (MAC) layer controller 38. The PHY IC 35 includes a position and/or motion tracking RF section 32, a control interface RF section 34, and a baseband processing module 36. The game console 30 may use a standardized protocol, a proprietary protocol, and/or a combination thereof to provide the communication between the gaming object 40 and the console 30.

The MAC controller 38 triggers position and/or tracking data collection, formatting of the data, processing of the data, and/or controlling position and/or tracking data communications and/or control interface communications. The position and/or tracking RF section 32 includes circuitry to transmit/receive one or more RF signals including the position and/or tracking data. The control interface RF section 34 includes circuitry to transmit/receive control information related to the collection and/or processing of the position and/or tracking data. The position and/or tracking data may include, for example, the received combined RF signals and/or the signal information representing signal properties of the received combined RF signals.

When operating as a game console 30, the MAC controller 38 further operates to determine the environment parameters of the gaming environment corresponding to the physical area in which the gaming object moves, and to map the environment parameters to a particular coordinate system. In addition, the MAC controller 38 operates to determine the coordinates of the gaming object's position in the gaming environment and to facilitate video game play in accordance with the gaming object's coordinates.

The MAC controller 38 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The MAC controller 38 may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the MAC controller implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-23.

FIGS. 12-14 are diagrams of an embodiment of a coordinate system of a localized physical area that may be used for a gaming system including a mobile gaming object 40 and a game console 30. In these figures, an xyz origin is selected to be somewhere in the localized physical area and each point being tracked and/or used for positioning on the gaming object 40 is determined based on its Cartesian coordinates (e.g., x1, y1, z1). As the gaming object 40 moves, the new position of the tracking and/or positioning points are determined in Cartesian coordinates with respect to the origin.

FIGS. 15-17 are diagrams of another embodiment of a coordinate system of a localized physical area that may be used for a gaming system including a mobile gaming object 40 and a game console 30. In these figures, an origin is selected to be somewhere in the localized physical area and each point being tracked and/or used for positioning on the gaming object 40 is determined based on its vector, or spherical, coordinates ($\rho$, $\phi$, $\theta$), which are defined as: $\rho \geq 0$ is the distance from the origin to a given point P. $0 \leq \phi \leq 180°$ is the angle between the positive z-axis and the line formed between the origin and P. $0 \leq \theta \leq 360°$ is the angle between the positive x-axis and the line from the origin to the P projected onto the xy-plane. $\phi$ is referred to as the zenith, colatitude or polar angle, while $\theta$ is referred to as the azimuth. $\phi$ and $\theta$ lose significance when $\rho = 0$ and $\theta$ loses significance when $\sin(\phi) = 0$ (at $\phi = 0$ and $\phi = 180°$). To plot a point from its spherical coordinates, go $\rho$ units from the origin along the positive z-axis, rotate $\phi$ about the y-axis in the direction of the positive x-axis and rotate $\theta$ about the z-axis in the direction of the positive y-axis. As the gaming object 40 moves, the new position of the tracking and/or positioning points are determined in vector, or spherical, coordinates with respect to the origin.

While FIGS. 12-17 illustrate two types of coordinate system, any three-dimensional coordinate system may be used for tracking motion and/or establishing position within a gaming system.

FIGS. 18-20 are diagrams of a coordinate system for tracking motion of a gaming object 40. In these figures, an origin is selected to be somewhere in the localized physical area and the initial position of a point being tracked on the gaming object 40 is determined based on its vector, or spherical coordinates (e.g., $\rho 1$, $\phi 1$, $\theta 1$). As the gaming object 40 moves, the new position of the tracking and/or positioning points are determined as a vector, or spherical coordinates with respect to the preceding location (e.g., $\Delta V$, or $\Delta \rho$, $\Delta \phi$, $\Delta \theta$). As another example, the positioning and motion tracking of the player may be done with reference to the position of the gaming object 40, such that the gaming objects position is determined with reference to the origin and/or its previous position and the position of the player is determined with reference to the gaming object's position.

Figure 22:
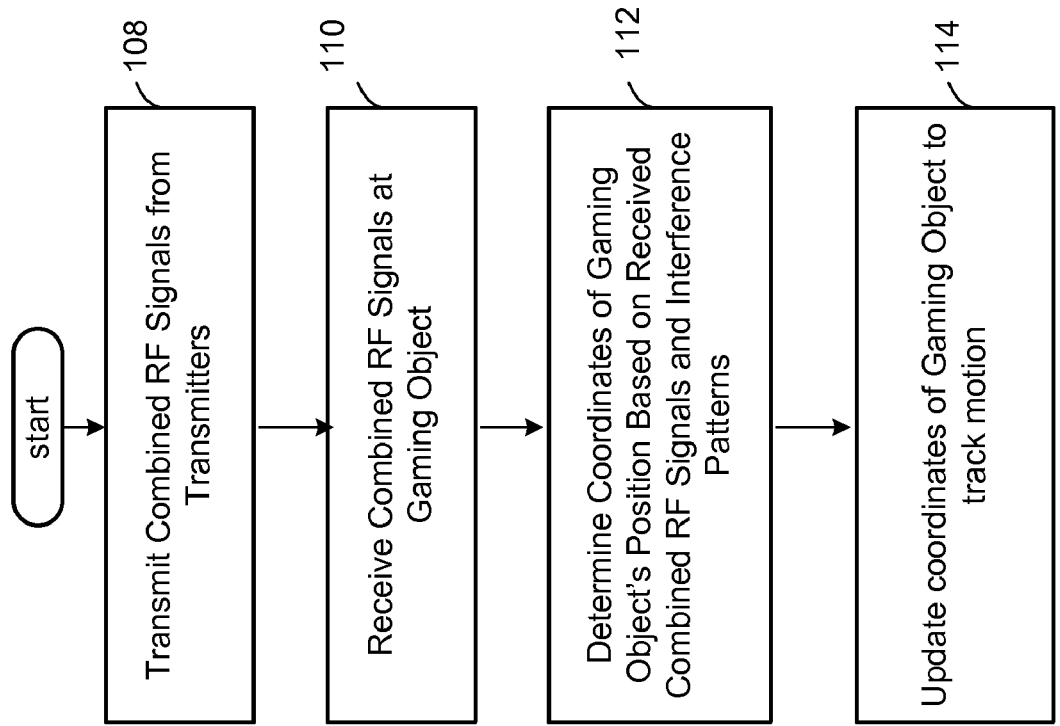
FIGS. 21 and 22 are diagrams of a method for determining position and/or motion tracking in accordance with the present invention.
Figure 21:
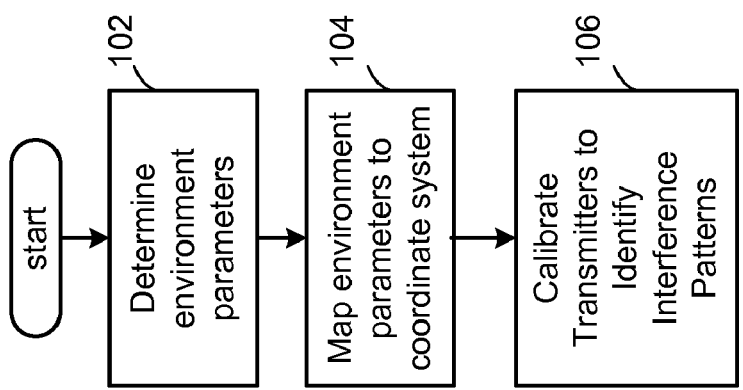

FIGS. 21 and 22 are diagrams of a method for determining position and/or motion tracking that begins at step 102 by determining the environment parameters (e.g., determining the properties of the localized physical area such as height, width, depth, objects in the physical area, etc.). The method then continues at step 104 by mapping the environment parameters to a coordinate system (e.g., Cartesian coordinate system of FIGS. 12-14 or spherical coordinate system of FIGS. 15-17). Once the transmitters are placed within the gaming environment, the method continues at step 106 with calibrating the transmitters to determine the fixed locations of the transmitters within the coordinate system and to identify the particular interference patterns of constructive and destructive areas created by each of the transmitters based on the frequency offsets utilized by each of the transmitters.

In FIG. 22, the method continues at step 108 by transmitting combined RF signals from multiple transmitters within the gaming environment, in which each of the combined RF signals is produced from a combination of two or more individual RF signals at different carrier frequencies. Upon receiving the combined RF signals at the mobile gaming object at step 110, the method continues at step 112 by determining the coordinates of the gaming object's initial position based on the constructive/destructive area that the mobile gaming object lies within, as described above. The method then continues at step 114 by updating the gaming object's position to track the gaming object's motion based on the constructive/destructive areas. It should be noted that the rate of tracking the motion of the gaming object may be done at a rate based on the video gaming being played and the expected speed of motion. It should be further noted that a tracking rate of 10 milliseconds provides 0.1 mm accuracy in motion tracking.

Figure 23:
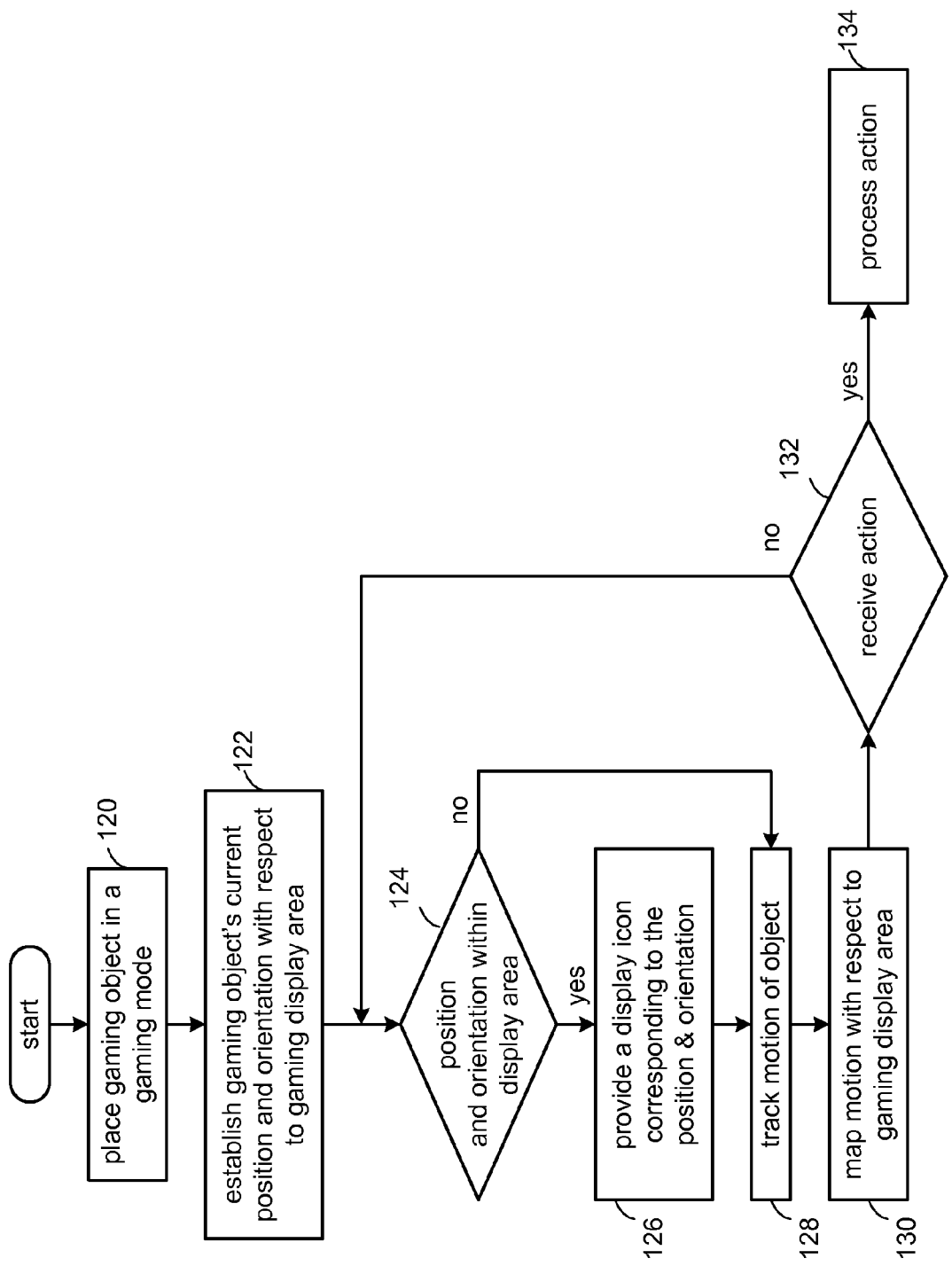
FIG. 23 is a diagram of a method for processing a position and/or motion based gaming action in accordance with the present invention.

FIG. 23 is a diagram of a method for processing a position and/or motion based gaming action that begins at step 120 by placing the gaming object (e.g., a controller) and/or game console in a gaming mode. The method continues at step 122 by establishing the gaming object's current position and orientation with respect to an initial position in a gaming display area as determined by mapping the current position and orientation within the gaming environment to the gaming display area. For example, if the game being played is a shooing arcade game and the gaming object is functioning as a gun, this step determines the initial aiming of the gun.

The method continues at step 124 by determining whether the position and orientation of the gaming object is within the gaming display area. If yes, the method continues at step 126 by providing a display icon corresponding to the position and orientation. For example, the icon may be cross hairs of a gun to correspond to the aiming of the video game gun. The method continues at steps 128 and 130 by tracking the motion of the gaming object and mapping the motion to the gaming display area.

The method continues at step 132 by determining whether an action has been received. For example, has the trigger of the gun been pulled? If not, at step 124, the process repeats as shown. If yes, the process continues at step 134 by processing the action. For example, the processing may include mapping the shooting of the gun in accordance with the aiming of the gun.

As may be used herein, the term(s) "coupled to" and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A system comprises:
    a plurality of transmitters associated with a video gaming environment and coupled to transmit a plurality of combined Radio Frequency (RF) signals, wherein a given combined RF signal of the plurality of combined RF signals includes at least a pair of RF signals that have a known relationship therebetween;
    a mobile gaming object that includes:
        a receiver coupled to receive the plurality of combined RF signals to produce a plurality of received combined RF signals; and
        a processing module operable to produce signal information representative of properties of the plurality of received combined RF signals; and
    a controller operable to:
        determine respective distances between the mobile gaming object and each of the plurality of transmitters based on the signal information and the known relationship therebetween; and
        determine a position of the mobile gaming object within the video gaming environment based on the distances.

2. The system of claim 1, wherein the controller is further operable to map the position to a coordinate system, and wherein the coordinate system is applied to a given physical area defined by the video gaming environment.

3. The system of claim 2, wherein the mobile gaming object comprises the controller, and the system further comprises:
    a game console device that includes:
        a receiver coupled to receive the position of the mobile gaming object as mapped to the coordinate system; and
        a processing module operable to process a video game function in accordance with the position of the mobile gaming object.

4. The system of claim 2, wherein the controller comprises:
    a first controller operable to determine the respective distances between the mobile gaming object and each of the plurality of transmitters based on the signal information; and
    a second controller operable to determine a position of the mobile gaming object within the gaming environment based on the distances and to map the position to the coordinate system.

5. The system of claim 4, wherein the mobile gaming object comprises the first controller, and the system further comprises:
    a game console device that comprises:
        a receiver coupled to receive the distances from the mobile gaming object; and
        the second controller, wherein the second controller is further operable to process a video game function in accordance with the position of the mobile gaming object.

6. The system of claim 2 further comprises:
    a game console device that includes:
        a receiver coupled to receive the signal information from the mobile gaming object; and
        the controller, wherein the controller is further operable to process a video game function in accordance with the position of the mobile gaming object.

7. The system of claim 1, wherein the known relationship between the pair of RF signals of the given combined RF signal comprises a known frequency offset or a known phase offset between the pair of RF signals.

8. The system of claim 7, wherein the given combined RF signal operates to produce an interference pattern of alternating constructive and destructive interference areas originating from a known location of a given transmitter of the plurality of transmitters.

9. The system of claim 8, wherein the signal information of a given received combined RF signal of the plurality of received combined RF signals comprises an interference indicator that indicates whether the given received combined RF signal is associated with one of the constructive interference areas or one of the destructive interference areas.

10. The system of claim 9, wherein the signal information of the given received combined RF signal further comprises a received signal strength indicator, and wherein the controller operates to determine the distance between the given transmitter and the mobile gaming object based on the interference indicator and the received signal strength indicator.

11. The system of claim 10, wherein the alternating constructive and destructive interference areas comprise, in a plane, concentric rings centered on the given transmitter, and wherein the controller operates to determine the distance between the given transmitter and the mobile gaming object by identifying a particular one the concentric rings that the mobile gaming object is located in using the interference indicator and the received signal strength indicator.

12. The system of claim 8, wherein:
a first signal of the pair of RF signals has a fixed frequency or phase and a second signal of the pair of RF signals has a variable frequency or phase;
the given combined RF signal produces a different respective interference pattern for each frequency or phase of the second signal;
the controller operates to determine where the mobile gaming object lies within each of the different interference patterns to produce distance data representative thereof; and
the controller further operates to determine the respective distance between the given transmitter and the mobile gaming object using the distance data.

13. The system of claim 1, wherein each of the transmitters includes a pair of transmitters physically separated by a known distance, each of the transmitters in a given pair of transmitters transmitting a respective RF signal at a known frequency to produce the given combined RF signal.

14. The system of claim 1, wherein the mobile gaming object further comprises:
a first antenna operable to receive a first RF signal of the pair of RF signals;
a second antenna operable to receive a second RF signal of the pair of RF signals; and
a third antenna operable to receive the given combined RF signal.

15. The system of claim 1, wherein the controller is further operable to track the position of the mobile gaming object by determining subsequent positions of the mobile gaming object within the video gaming environment.

16. The system of claim 1, wherein each of the combined RF signals is a Time Division Multiple Access (TDMA) signal operating at the same frequencies.

17. The system of claim 1, wherein each of the combined RF signals is a Frequency Division Multiple Access (FDMA) signal.

18. A mobile gaming object comprises:
a receiver coupled to receive a plurality of combined Radio Frequency (RF) signals from a plurality of transmitters to produce a plurality of received combined RF signals, wherein each of the plurality of combined RF signals includes a respective pair of RF signals that have a known relationship therebetween and that produce a respective interference pattern of alternating constructive and destructive interference areas originating from a respective known location of a respective one of the plurality of transmitters; and
a processing module operable to produce signal information representative of properties of the plurality of received combined RF signals, wherein the signal information for each of the plurality of received combined RF signals indicates whether the respective received combined RF signal is associated with one of the constructive interference areas or one of the destructive interference areas.

19. The mobile gaming object of claim 18, wherein the processing module further operates to:
determine respective distances between the mobile gaming object and each of the plurality of transmitters by determining which of the constructive and destructive interference areas the mobile gaming object lies within; and
determine a position of the mobile gaming object within a video gaming environment based on the distances.

20. The mobile gaming object of claim 19, wherein:
a first signal of each of the pairs of RF signals has a fixed frequency or phase and a second signal of each of the pairs of RF signals has a variable frequency or phase;
each of the combined RF signals produces different interference patterns based on the frequency or phase of the respective second signals;
the processing module operates to determine where the mobile gaming object lies within each of the different interference patterns to produce distance data representative thereof; and
the processing module further operates to determine the respective distances between each of the transmitters and the mobile gaming object using the distance data.

21. The mobile gaming object of claim 19 further comprises:
a transmitter operable to transmit the position of the mobile gaming object to a game console device.

22. The mobile gaming object of claim 19, wherein the processing module is further operable to map the position to a coordinate system, and wherein the coordinate system is applied to a given physical area defined by the video gaming environment.

23. The mobile gaming object of claim 19, wherein the signal information of each of the received combined RF signal further comprises a respective received signal strength indicator.

24. The mobile gaming object of claim 23, wherein the alternating constructive and destructive interference areas comprise, in a plane, concentric rings centered on the given transmitter, and wherein the processing module operates to determine the distance between the given transmitter and the mobile gaming object by identifying a particular one the concentric rings that the mobile gaming object is located in using the received signal strength indicator.

25. The mobile gaming object of claim 19, wherein the processing module is further operable to track the position of the mobile gaming object by determining subsequent positions of the mobile gaming object within the gaming environment.

26. The mobile gaming object of claim 18, wherein the known relationship between the pair of RF signals of the given combined RF signal comprises a known frequency offset or a known phase offset between the pair of RF signals.

27. The mobile gaming object of claim 18, further comprises:
   a first antenna operable to receive a first RF signal of the pair of RF signals;
   a second antenna operable to receive a second RF signal of the pair of RF signals; and
   a third antenna operable to receive the given combined RF signal.

28. The mobile gaming object of claim 18, wherein each of the combined RF signals is a Time Division Multiple Access (TDMA) signal operating at the same frequencies.

29. The mobile gaming object of claim 18, wherein each of the combined RF signals is a Frequency Division Multiple Access (FDMA) signal.

30. A system comprises:
   a mobile gaming object within a video gaming environment that includes a transmitter coupled to transmit a combined RF signal, wherein the combined RF signal includes at least a pair of RF signals that have a known relationship therebetween;
   a plurality of receivers associated with the video gaming environment coupled to receive the combined Radio Frequency (RF) signal to produce respective received combined RF signals, and operable to produce signal information representative of properties of the respective received combined RF signals; and
   a controller operable to:
      determine respective distances between the mobile gaming object and each of the plurality of receivers based on the signal information and the known relationship therebetween; and
      determine a position of the mobile gaming object within the video gaming environment based on the distances.

* * * * *